United States Patent [19]

Jaeger

[11] 4,386,501
[45] Jun. 7, 1983

[54] HEAT PUMP USING LIQUID AMMONIATED AMMONIUM CHLORIDE, AND THERMAL STORAGE SYSTEM

[75] Inventor: Frederick A. Jaeger, Denver, Colo.

[73] Assignee: Martin Marietta Corporation, Bethesda, Md.

[21] Appl. No.: 287,992

[22] Filed: Jul. 29, 1981

[51] Int. Cl.³ .............................................. F25B 15/00
[52] U.S. Cl. ....................................... 62/112; 252/69; 62/235.1
[58] Field of Search ................... 62/112, 235.1; 252/69

[56] References Cited

U.S. PATENT DOCUMENTS

| | | | |
|---|---|---|---|
| 1,961,890 | 6/1934 | Miller et al. | 252/69 X |
| 2,184,993 | 12/1939 | Coons | 252/69 X |
| 2,185,040 | 12/1939 | Smith et al. | 62/112 |
| 2,986,525 | 5/1961 | Hughes | 252/69 X |
| 3,520,812 | 7/1970 | Ecklund | 62/112 X |

Primary Examiner—Lloyd L. King
Attorney, Agent, or Firm—Yount & Tarolli

[57] ABSTRACT

A thermochemical heat pump/energy storage system using a liquid ammoniated salt, that is, a salt complexed or reacted with ammonia, is described. The system, which can be used for heating or cooling an enclosure either in a batch operation or continuously, provides energy storage for both heating and cooling functions. The energy is stored predominantly as chemical energy which has substantially no limit on the period during which it may be stored. A pumpable liquid ammoniated absorbent formed by chemically combining about equimolar amounts of ammonia with ammonium chloride ("low ammoniate"), can be further ammoniated to form a "high ammoniate" containing about 3 moles of ammonia. The high ammoniate is desorbed at a heat source temperature below 100° C. available from a geothermal well or the like, and preferably at a heat source temperature below 80° C. available from a solar collector, a feature which is especially well-adapted for the use of solar and geothermal heat to provide cooling in a residential application. Refrigeration may be provided for commercial use with low temperature waste process streams which are now an economic burden on industry because they are unusable profitably as a heat source.

9 Claims, 4 Drawing Figures

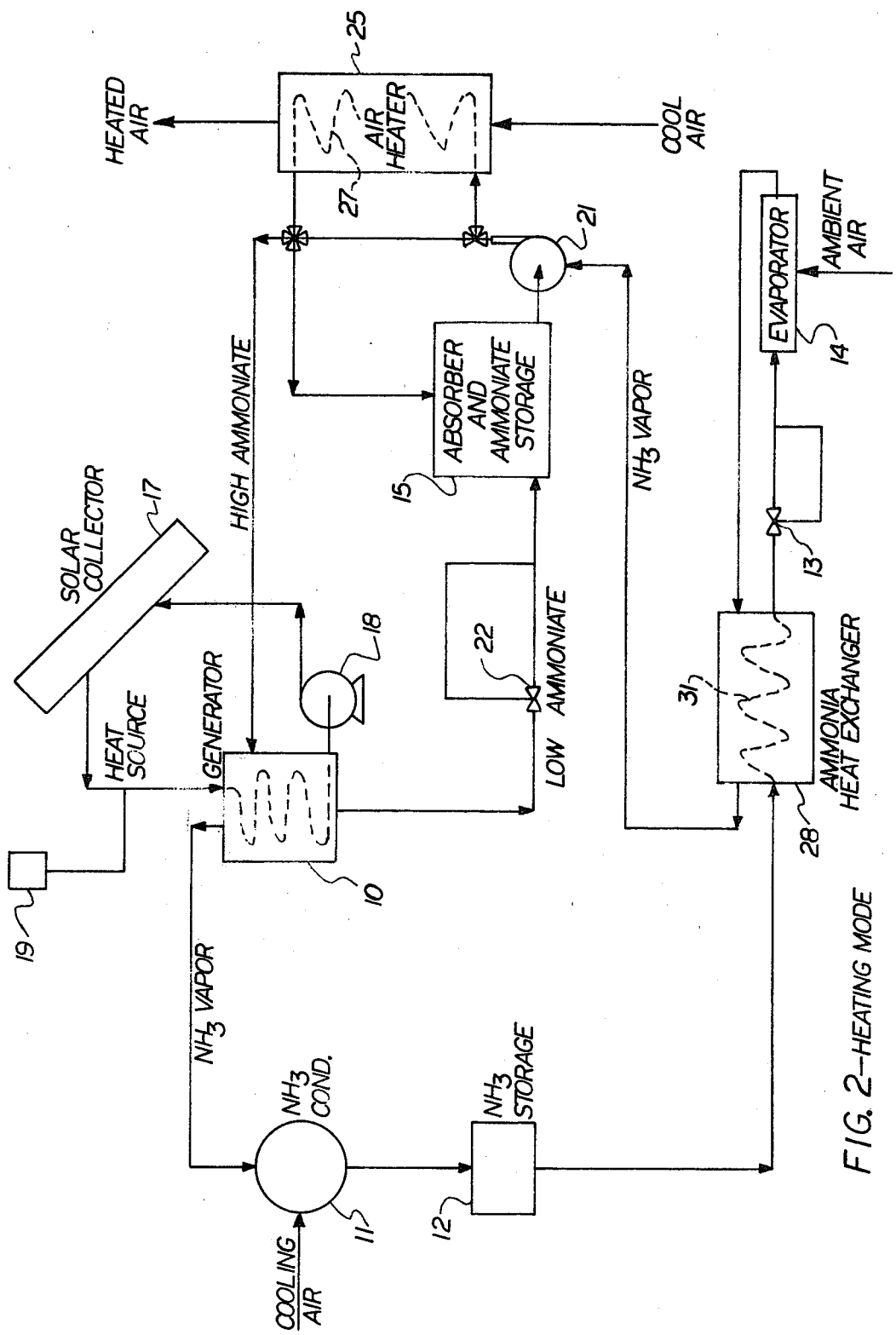

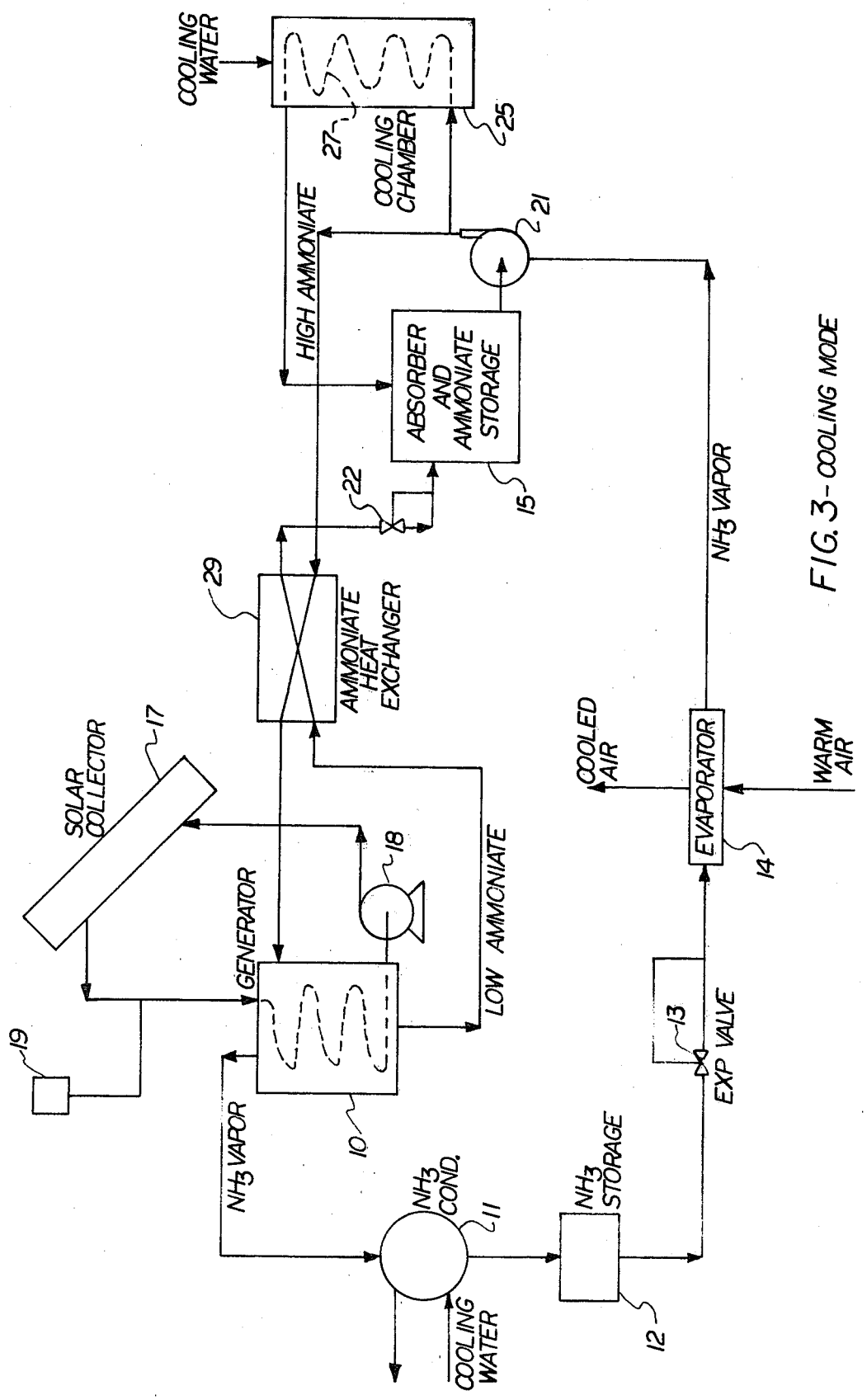
FIG. 3 — COOLING MODE

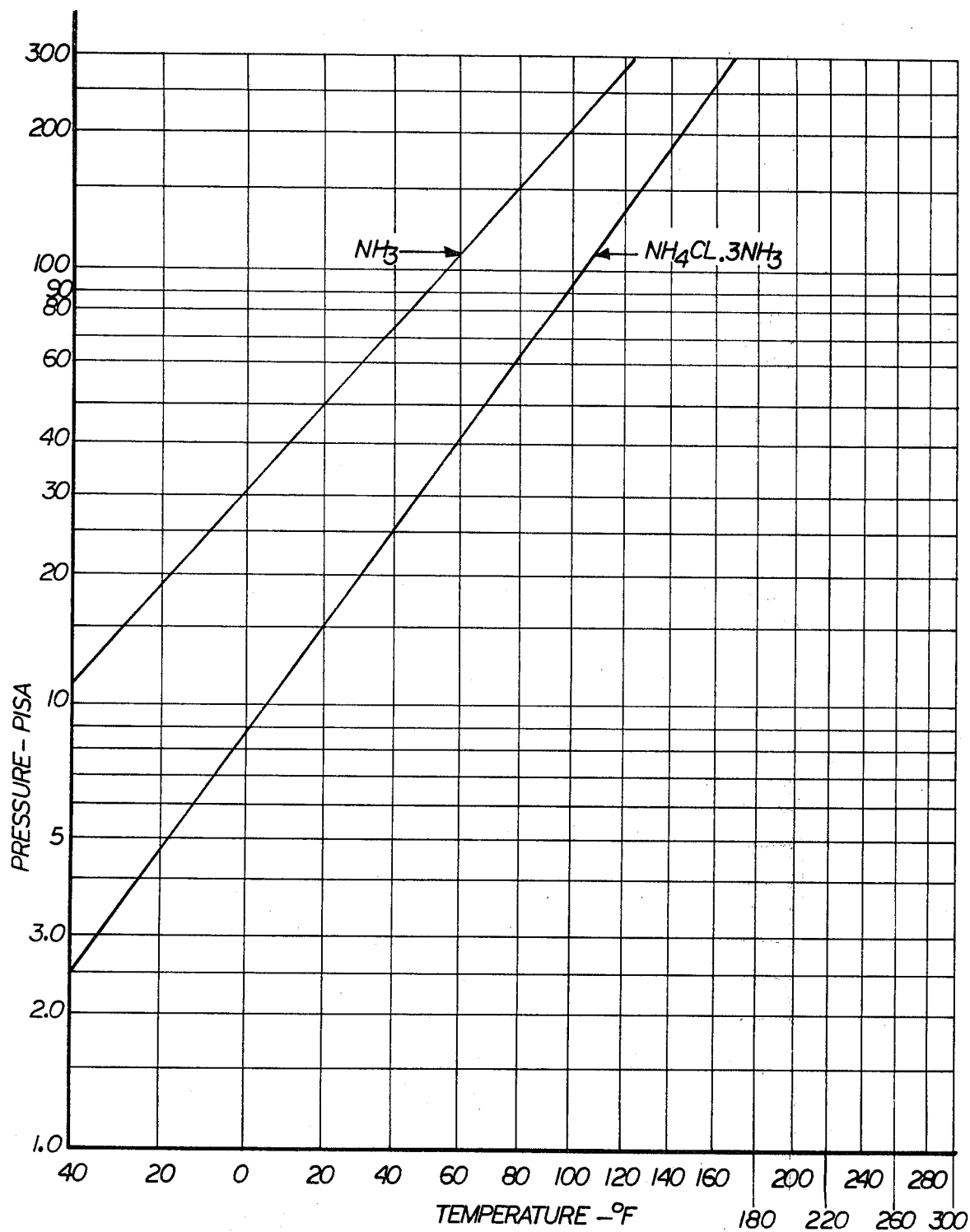
FIG.4—AMMONIUM CHLORIDE EQUILIBRIUM

HEAT PUMP USING LIQUID AMMONIATED AMMONIUM CHLORIDE, AND THERMAL STORAGE SYSTEM

BACKGROUND OF THE INVENTION

Heat pumps are widely used for heating and cooling buildings primarily in moderate climates. Such heat pumps generally include a refrigeration system having a condenser exposed to ambient conditions and an evaporator exposed to the enclosure, house or other zone to be air conditioned so as to provide cooling for the zone. To heat the zone, suitable means, generally including flow control valves, are provided to transfer heat required for the evaporation portion of the process to the ambient surroundings, and to transfer heat generated by the condenser portion of the process to the zone. The reason such systems are primarily used in moderate climates is because of the relatively limited heat output capability for the refrigeration system's condenser.

This invention relates to a working fluid and, to a process specifically designed to include a heat pump system to provide, optionally, heat and/or refrigeration by suitable heat exchange, using operations that include vaporization, expansion, and condensation of a chemically and thermally stable refrigerant which is alternately absorbed and desorbed from the working fluid without using a compressor. More particularly, the invention relates to a heat pump based on an absorption system which uses an improved working fluid, and the heat pump may be used either continuously or in a cyclical (that is, "batch-type") operation, depending upon the work it is to perform. The working fluid is a liquid ammoniate formed by ammoniating ammonium chloride to form a reaction product or complex (hereafter "complex" for brevity) of ammonia with the ammonium chloride, and is not a simple physical solution of the chloride in ammonia, but chemically combined with it. To function as the absorbent, the working fluid is the complex containing no more ammonia than is effective to make the absorbent a pumpable liquid, in which state the absorbent is therefore referred to as a "low ammoniate". After the absorbent has reacted with and absorbed as much ammonia as it can, the working fluid becomes a highly ammoniated complex (hence referred to as "high ammoniate") which is to be desorbed in the generator.

As long ago as the begining of this century it was known that various thiocyantes and the nitrate, bromide and iodide of ammonia were well-adapted for use in an absorption system. The use of these salts in elemental refrigeration systems is disclosed in U.S. Pat. Nos. 925,039 and 1,042,041 to William W. Seay who used a single vessel which served both as absorber and generator. In the earlier system of the '039 patent he converted a solid salt to liquid ammoniate, and after desorbing the ammonia, the solid salt was re-formed. In the later '041 patent he recognized the advantage of maintaining the ammoniate in liquid form. But such systems appear to have been largely disregarded for a variety of technical and economical reasons. Seay missed the fact that ammonium chloride was particularly well-suited to his purpose. As is well-known to those skilled in the art, it is knowledge of the physical and chemical properties of a material which suggests its utility for a particular purpose.

Nearly a half century later, U.S. Pat. No. 2,986,525 to Hughes discloses the use of anhydrous mixtures of the halides of the alkaline earth metals and various nitrates and chlorides such as lithium and ammonium nitrates or chlorides to form a strong porous mass for absorption of ammonia when the mass is cooled, and desorption of the ammonia when the mass is heated. The salts, one of which may be ammonium chloride, are fused and intimately blended together to form a "eutectoid". Because the entire porous mass is to be alternately cooled when it is to function as an absorber, and then heated when it is to function as a generator in which ammonia is desorbed, operation of the '525 absorption refrigeration system is necessarily cyclical. The absorbent cannot be continuously circulated between the absorber and the generator. Since it is known that ammonium chloride is essentially insoluble in a complex of ammonium chloride and ammonia, there was no reason, particularly in view of the disclosed preference of a eutectoid, to expect that a complex formed by approximately equimolar quantities of ammonium chloride and ammonia would provide a pumpable liquid especially well-adapted for use as the absorbent in a continuously or cyclically operable heat pump in which the energy is provided by a heat source below 100° C. This anomolous physical property of ammonium chloride, inter alia, which is quite distinct from the behavior of other ammonium salts, presumably accounts for its (the chloride's) exclusion from the many salts suggested by Seay, supra.

The well-known ammonia-water system, though popular, uses a solution of ammonia in water and requires high operating pressures generally ranging up to about 400 pounds per square inch (psi), a source of high temperature heat above 100° C., and a rectifier to free the ammonia from entrained water. Also well-known is the lithium bromide-water combination and variations thereof, but such absorption-refrigeration systems are operated at subatmospheric pressures as disclosed in U.S. Pat. No. 3,541,015 to Macriss et al.

Less commonly used systems disclosed in the prior art use working fluids such as various organic fluid mixtures such as methylene chloride and substituted polyglycols described in U.S. Pat. No. 2,149,947 to Zellhofer. No prior art system which I know of uses ammoniated ammonium chloride as the working fluid in an absorption refrigeration system, or is so well-adapted for use with a geothermal heat source or a solar collector from which the available temperature is limited to about 80° C.

U.S. Pat. No. 3,458,445 to Macriss et al recognizes the importance of the practical considerations which are so critical with respect to the selection of the elemental parts of an absorption refrigeration system and compares the operation of earlier systems with one which uses a solution of monomethylamine and sodium thiocyanate as the working fluid. Clearly delineated is the importance of the choice of the working fluid because it will determine the coefficient of performance for the system, the cost of the equipment in the system, including, for example, whether or not a rectifier may be essential. Most important, neither the '445 patent nor any other prior art reference disclosing ammonia as the refrigerant suggests the desirability of formulating a working fluid which would function in a generator which is operable under charging conditions with a source of low temperature heat at a temperature below 80° C. In an environment of already high and steadily increasing energy costs, there is a great need to utilize heat from relatively low temperature heat sources which to date have defied profitable utilization. This invention provides a practical heating/refrigeration absorption system which can profitably utilize fluids heated with solar energy, geothermal fluids, and heat from process streams now wasted.

SUMMARY OF THE INVENTION

It has been discovered that a reaction product or complex (hereafter "complex", for brevity) of ammonia with about an equimolar quantity of ammonium chloride provides an absorbent for gaseous ammonia which reacts with it, resulting in a pumpable liquid. This pumpable liquid, referred to as "low ammoniate" when it is used as absorbent for ammonia, and as "high ammoniate" when it is to be desorbed, provides the working fluid for a heat pump. This heat pump is effective in this particular liquid phase absorption-desorption system because the high ammoniate can be desorbed, unexpectedly easily, by heating with a relatively low temperature source of heat below about 100° C., and even below the boiling point of water.

It is therefore a general object of this invention to provide a heat pump either to heat or cool a zone to be air conditioned, by utilizing an absorption-desorption system in which ammonia (referred to as "refrigerant" herein, irrespective of whether the system is used in the heating or cooling mode), is alternately absorbed and desorbed from the working fluid.

It is another general object of this invention to provide a heat pump which uses a novel working fluid consisting essentially of continuously varying amounts of ammonia chemically combined with ammonium chloride to form ammoniated ammonium chloride ("ammoniate" for brevity), the amount of ammonia varying from a minimum sufficient to form a pumpable liquid low ammoniate, to a maximum approaching ammoniation of the working fluid with up to 3 moles of ammonia per mole of ammonium chloride.

It is also a general object of this invention to provide a heat pump usable in a cooling mode, either in a batch operation or continuously, to provide a refrigeration system for cooling air by passing it over an evaporator in which ammonia is evaporated; and, in a heating mode, either in a batch operation or continuously, for heating air in the zone by passing it over a heat exchanger in a liquid heat transfer loop which provides heat generated by the heat of absorption of ammonia in the absorbent.

It is a specific object of this invention to provide an ammonia absorption refrigeration system which can utilize waste low temperature process streams, geothermal heat, or solar heat at a temperature which may be as low as 65° C., and more preferably in the range from 65° C. to below 100° C., to desorb ammonia from a high ammoniate working fluid consisting essentially of one mole of ammonium chloride complexed with about 3 moles of ammonia, while maintaining a coefficient of performance of at least about 0.6, and more preferably about 90% of the theoretical.

It is also a general object of this invention to provide an ammoniated working fluid which may be used with either a water cooled or air cooled absorption refrigeration and/or heating system in which the absorbent composition, and is circulated continuously between the absorber and the generator.

Other general objects of this invention are to provide an ammoniate working fluid in which a minimum amount of ammonia is always chemically combined with ammonium chloride, and which further combines with additional ammonia refrigerant which is desorbable from it by a heat source below 90° C., and as low as 65° C.; which working fluid provides a high heat transfer coefficient because it is liquid, which has low vapor pressure, acceptable heat capacity and low viscosity; which working fluid is relatively non-corrosive, non-toxic and economically desirable and feasible where no prior art heat pump system has provided satisfactory results.

BRIEF DESCRIPTION OF THE DRAWINGS

The foregoing and other objects and advantages of the invention will appear more fully from the following description, made in connection with the accompanying drawings, of preferred embodiments of the invention, wherein like reference characters refer to the same or similar parts throughout the several figures, and in which:

FIG. 2 is a schematic illustration of the heat pump in a heating mode adapted for use during warm days and cool nights in a typical residential unit calling for cooling of a zone to be air conditioned during the warm day, and heating of the zone in the cold night, for around-the-clock thermostatic control of the zone.

FIG. 3 is a schmatic illustration of the heat pump in a cooling mode adapted for use during warm days and warm nights in a typical residential unit calling for cooling of the zone to be air conditioned.

FIG. 4 is a graph showing the equilibrium curves for high ammoniate which is represented as $NH_4Cl.3NH_3$ and ammonia; the curve for low ammoniate (absorbent) represented as $NH_4Cl.NH_3$ is substantially superimposed on the curve for $NH_4Cl.3NH_3$ in the temperature range shown, indicating the unique equilibrium properties of the ammoniate which permit operation of the heat pump with a low temperature heat source.

DETAILED DESCRIPTION OF PREFERRED EMBODIMENTS

Figure 1:
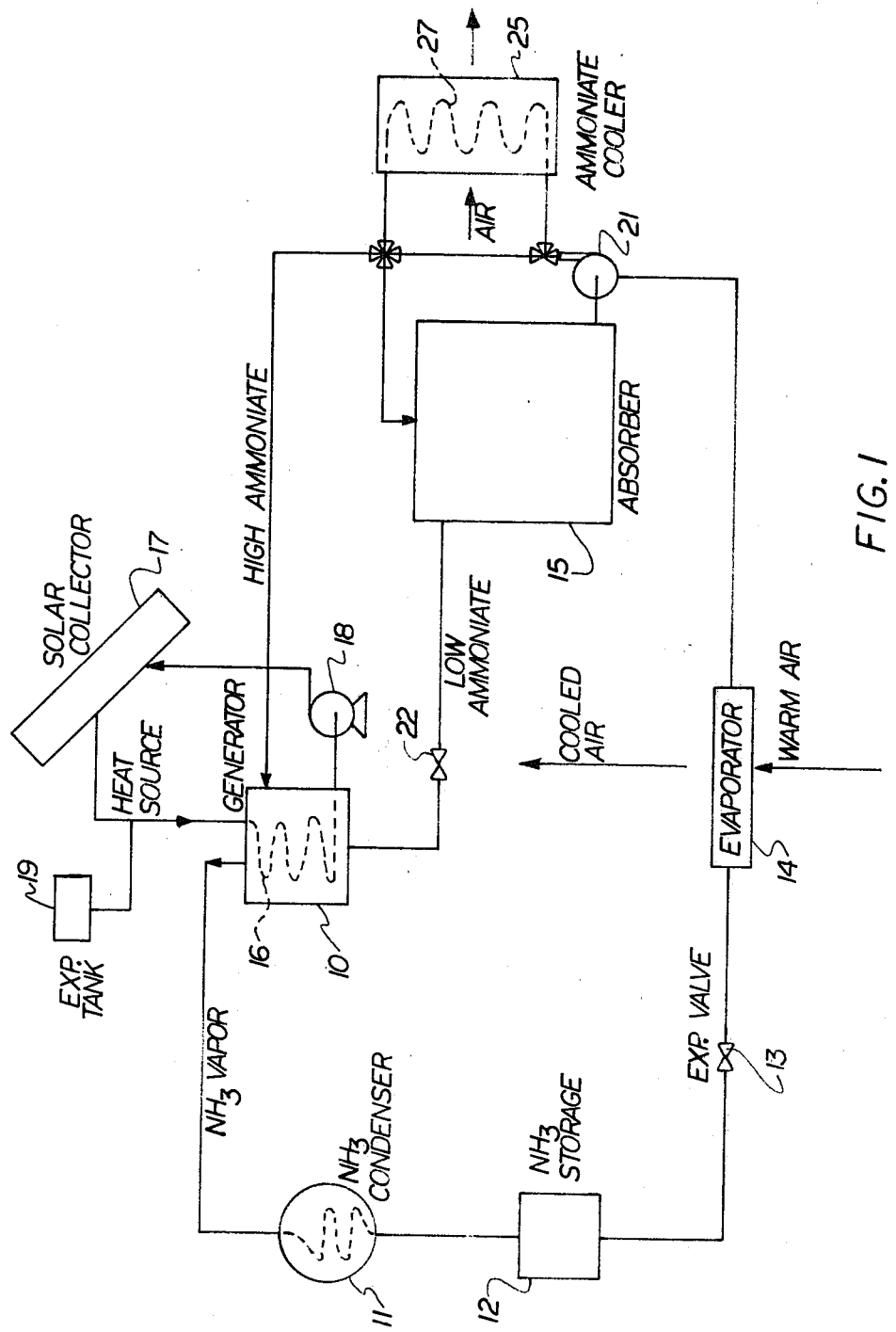
FIG. 1 is a schematic illustration of the heat pump utilizing the absorption-desorption system using ammonia as the refrigerant, and ammoniated ammonium chloride as the working fluid. The heat pump is shown for operation in a continuous heating and/or cooling mode requiring separate vessels for the generator and the absorber.

In its preferred embodiment, this invention is especially well-suited to the use of geothermal or solar heat at a temperature as low as 65° C. to provide refrigeration. The system of the invention is particularly directed to cooling a dwelling unit, such as a single family house, both during the day and the night, when the system is used as an absorption refrigeration system. When used as a heat pump in a heating mode, the system provides heat for the house. When used in a batch mode, that is, cyclically to cool and heat the house alternately, the system is especially practical to cool the house during a warm day and then, to heat the house during a cool night, typical of the weather which is quite prevalent in the southwestern parts of the United States and many other regions of the world where geothermal and solar heat sources are available.

The particular working fluid of this invention is formed as a liquid ammoniate consisting essentially of a reaction product or complex of ammonia with ammonium chloride. The term "complex" is used hereafter to describe what is also regarded as being the reaction product of ammonia with the ammonium chloride (NH4Cl) salt, because the precise manner in which the ammonia is chemically combined with the salt is not known. To obtain a low ammoniate absorbent which is a pumpable liquid, it is essential that the complex contain a minimum proportion of ammonia. It is desirable that this minimum proportion of ammonia in the complex be maintained substantially constant when it is drawn from the generator, prior to the absorbent absorbing additional ammonia.

In the low ammoniate complex of ammonia and ammonium chloride (referred to hereafter as "chloride absorbent"), the minimum amount of ammonia is about one mole of ammonia per mole of ammonium chloride, so that about 53.5 parts by weight (wt) of ammonium chloride are chemically combined with about 17 parts by wt of ammonia. The reaction may be represented as follows:

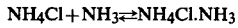

NH4Cl + NH3 ⇌ NH4Cl.NH3

Thus, at least about 24 percent (%) by wt of the chloride absorbent consists of ammonia.

When the low ammoniate is enriched by absorbing additional ammonia and becomes high ammoniate it contains about 3 moles of ammonia per mole of ammonium chloride, so that about 53.5 parts of ammonium chloride are chemically combined with about 51 parts by wt of ammonia. The reaction may be represented as follows:

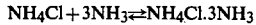

NH4Cl + 3NH3 ⇌ NH4Cl.3NH3

Thus, at least about 48.6% by wt of the high ammoniate consists of ammonia.

Referring now to FIG. 1 there is schematically illustrated, with the main components labeled, the heat pump of this invention for continuous operation, utilizing ammoniated ammonium chloride as the working fluid, irrespective of whether it is used in an absorption refrigeration mode typical of summer operation, or in a heating mode during cold weather. Ammonia is desorbed from the high ammoniate in a generator indicated generally by reference numeral 10. The generator is in open fluid communication with an ammonia condenser indicated generally by reference numeral 11. Condensed ammonia flows into an ammonia tank indicated generally by reference numeral 12, from which liquid ammonia passes through expansion valve 13 into evaporator 14 over which warm air to be cooled is flowed, and by so doing, is chilled. Warmed ammonia vapors from the evaporator are ducted to the suction of an ammoniate recirculation pump 21. The vapors are absorbed in the ammoniate which is flow proportioned in any predetermined ratio between an absorber indicated generally by reference numeral 15, and an ammoniate cooler 25. Recirculated low ammoniate is thus gradually enriched with ammonia until the low ammoniate becomes high ammoniate.

The generator is provided with a heating core 16 through which a heat source such as a heat transfer fluid from a solar collector 17 is pumped by pump 18 at a temperature sufficiently high to desorb ammonia from the high ammoniate held under elevated pressure in the generator. An expansion tank 19 is preferably provided in the recirculation loop of the heat transfer fluid between solar collector 17 and generator 10 (hereafter "generator heat transfer loop"). A preferred pressure in the generator is in the range from about 140 psia to about 200 psia and the preferred temperature of the heat source is in the range from about 65° C. to about 90° C. It will be apparent that the upper limit of the temperature of the heat source is arbitrary and may be as high as about 200° C. The lower limit is determined by the temperature differential which is the driving force for desorbing the ammonia from the working fluid. Since this invention is most particularly directed to utilizing a heat source such as a geothermal stream or a fluid heat transfer stream heated in a solar collector, the invention is practical and will be most beneficial where the temperature of the heat source is about 65° C.

The system operates in two well-defined modes, namely the charging or "charge" mode and the discharging or "discharge" mode. In the charge mode the system utilizes the generator and its source of heat, and includes the ammonia condenser. The discharge mode of the system utilizes the ammonia tank, expansion valve, evaporator, and absorber with its cooling loop. Working fluid is continuously provided to the generator by recirculation pump 21 which draws high ammoniate from the absorber 15. The discharge from pump 21 flow-controlled to ammoniate cooler 25 may be cooled by air to be heated and recirculated, the ammoniate cooler serving as an air heater. Upon desorption of the ammonia from the high ammoniate in the generator, the low ammoniate flows into the absorber, the flow being controlled by valve 22.

In another embodiment, where indirect heat transfer from the heated ammoniate is to be effected with a heat transfer fluid in an absorber heat transfer loop, the absorber is provided with a cooling coil (not shown) through which a heat transfer fluid such as oil is recirculated by an oil pump (not shown) to the finned heat exchange tubes 27 in the ammoniate cooler. A valved stub is conventionally provided in the absorber heat transfer loop, to charge it with oil. Any conventional heat transfer fluid may be used, for example petroleum oil, glycols, and various commercially available heat transfer fluids such as those available under the Dowtherm brand name if the temperature of the fluid in the loop is to be relatively high. If the temperature of the heat transfer fluid in either the generator or absorber loops is to remain relatively low under the pressure conditions of the loop, water may be used, as is the case when heat transfer fluid from a solar collector, or a waste water heat source is used in the generator heat transfer loop to desorb ammonia in the generator.

It will presently be evident, that in the cooling mode, cooling of the heat transfer fluid in the absorber-heater loop will preferably be effected by cooling water recirculated from a cooling tower. For residential applications, cooling of the water may be provided with a cooling chamber.

In the ammonia condenser 11, ammonia may be condensed by heat exchange with ambient air or with cooling water from the cooling tower or chamber (also referred to as an "evaporative cooler"). It is most preferred to maintain a high enough pressure in the generator to condense the ammonia vapors driven from it with ambient air. Typically, heat transfer fluid from the solar collector is at a temperature of about 71° C. as it enters the heating core. The flow rate is sufficient to raise the temperature of high ammoniate in the generator to about 60° C. at which the ammonia vapor pressure is about 240 psia, as can be read from FIG. 4. Ammonia is condensed by rejecting heat to the atmosphere and condensing in the ammonia tank where it collects at a temperature of about 38° C. and 200 psia.

In the discharge mode, under cooling conditions, liquid ammonia from the ammonia tank 12 at 200 psia, flows through expansion valve 13 where it is vaporized in the evaporator 14 and picks up heat from the air to be cooled. The ammonia vapor then flows into the absorber where it complexes or "reacts" with low ammoniate giving off heat at about 35° C. at which the pressure is about 85 psia. To maintain the temperature in the absorber at 35° C., heat is rejected to the atmosphere by circulating ammoniate through an air cooled heat exchanger, namely ammoniate cooler 25.

A prototype of a system capable of heating and/or cooling a typical single family dwelling is schematically illustrated in its heating mode in FIG. 2. In actual operation, the system is charged by bringing heat from the solar collector 17 into the generator at 150° F. Ammonia is condensed in the ammonia condenser 11 by rejecting heat to ambient air at a temperature in the range from about −1.1° C. to about 15.6° C. The heated ambient air from out the ammonia condenser 11 may be ducted to the house, or to the air heater 25 for further heating before it is recirculated to the house. Liquid ammonia flows from the condenser into the ammonia tank 12 where it is held at a temperature of about 32.2° C. and a pressure of about 190 psia.

In the discharge mode, liquid ammonia at 190 psia flows through an expansion valve where it is vaporized and picks up heat from a low temperature source such as the ambient air at a temperature in the range from about −1.1° C. to about 15.6° C. The vapor flows to the absorber 15 where it is reacted with low ammoniate giving off heat. The absorber is used for storage of the ammoniate at about 35° C. and a pressure of about 85 psia. The ammoniate is circulated from the abosrber to the air heater 25 which heats air circulated to the building.

For improved efficiency in the heating mode it is desirable to provide an ammonia heat exchanger 28 in which ammonia vapors from the evaporator 14 are heated by contact with finned tubes 31 through which liquid ammonia from the storage tank is flowed before it is expanded in the expansion valve 13. The warmed vapors from the ammonia heat exchanger 28 flow to the inlet of the ammoniate recirculation pump 21 where they are absorbed, generating heat which is transferred to air recirculated through the air heater 25. The cooled ammoniate from the air heater flows to the absorber or to the generator where it is reheated by the low temperature heat source.

The system is intended to be used with an intermittent heat source such as solar. During the day when solar heat is available the ammoniate is circulated through the generator to drive off the ammonia and reduce the molar concentration of the ammonium chloride to its lower level ($NH_4Cl.NH_3$). The ammonia is stored in the ammonia storage tank. At night this ammonia flows on demand to the absorber to generate heat.

Where a continuous source of heat is available, whether it is geothermal heat, or a waste liquid stream, it will generally be more economical to use the heat source for direct heat exchange with air to be recirculated in the house. Thus, the system of this invention is most particularly suited to provide refrigeration where low temperature heat is abundant.

Operation of the system in the cooling mode is schematically illustrated in FIG. 3 wherein heat transfer fluid from a solar collector enters generator 10 and heats high ammoniate to a temperature of about 60° C. at which the pressure in the generator is about 190 psia. Ammonia liberated may be cooled by heat exchange with ambient air in a condenser as shown in FIG. 2, but is preferably cooled by heat exchange with cooling water in an evaporative cooler 11 because ambient air temperatures are likely to be too high to be economical. The condensed ammonia flows into the ammonia storage tank 12, the temperature of the condensed ammonia being in the range from about 90° F. to about 100° F. depending upon the temperature of the cooling water, or ambient summer air if its temperature is low enough to be effective. The liquid ammonia is expanded in expansion valve 13 into evaporator 14 where the heat of vaporization is provided by air recirculated through the house which is to be cooled. The ammonia vapors are fed to the inlet of pump 21 where it is absorbed in low ammoniate with generation of heat which is dissipated in water cooled chamber 25 by heat exchange with cooling water. The air heater used in the heating mode shown in FIG. 2 may be used to cool the ammoniate by heat exchange with ambient air, with appropriate changes in ducting, if the ambient air temperature is low enough. For the purpose of cooling during summery weather in locations where geothermal heat is available it will be found that a water or evaporative cooled chamber 25 is more economical in the system. Cooled low ammoniate is led into the absorber which also serves as a storage tank.

The efficiency of the system is improved by use of the heat exchanger 29. In this unit, the heat contained in the low ammoniate leaving the generator is transferred to the high ammoniate flow to the generator.

If a continuous source of heat is available, no ammonia or ammoniate storage tanks are required.

A typical refrigeration system using ammoniated ammonium chloride as the working fluid is compared in Table I hereunder with a typical ammonia-water system when each is operated with air-cooled condensers and each provides an evaporator temperature of 4.4° C. As will readily be appreciated the ammonia-water system requires a generator temperature above the boiling point of water (121° C. is used) while the generator of the claimed system operates at 60° C. The relevant figures for the ammonia-water system are reproduced from Table I in U.S. Pat. No. 3,458,445 and are believed to be substantially correct, except for the ideal C.O.P. (coefficient of performance) which cannot be corroborated as the method for computing it is not stated in the patent. The C.O.P. has been computed for the claimed system as follows:

C.O.P. = (refrigeration effect/energy input)

The refrigeration effect = (ammonia flow) (heat of vaporization)

The energy input = (ammonia flow) (heat of reaction)

Pump work = $(Q)(\Delta P)/(n)$ where Q = refrigeration/(density) (heat of reaction of ammoniate) and n = efficiency The figures for the claimed system have been calculated based upon the performance of a typical system designed for a residential unit capable of storing 500,000 BTU for heating and 250,000 BTU for cooling. The heating and cooling rates can be up to 70,000 BTU/hr and do not materially affect the comparison of relevant figures for the two systems.

The pumping factor RP used in the Table is defined as the pounds of the solution circulated between the generator and absorber per unit time divided by the pounds of ammonia vaporized per unit time. The pumping factor is thus a measure of the quantity of solution needed for circulation between the absorber and the generator to vaporize one pound of ammonia. The lower the pumping factor the more efficient is the system, all other things being the same.

TABLE I

Comparison of $NH_3-H_2O$ and $NH_3.(1-3)NH_4Cl$ working fluids

| Design Variables | $NH_3-H_2O$ | $NH_3.NH_4Cl$ |
| --- | --- | --- |
| Evaporator temp., °F. | 40 | 40 |
| Condenser temp., °F. | 120 | 120 |
| Generator temp., °F. | 250 | 250 |
| Absorber conc., wt % $NH_3$ | 44.3 | 48.8 |
| Generator conc., wt % $NH_3$ | 35.0 | 24. |
| Pumping factor, RP | 6.0 | 1.86 |
| Heat of vap., BTU/# | 536 | 536 |
| Heat of reaction, BTU/# | 751 | 700 |
| Pump work, HP/ton | $5.8 \times 10^{-2}$ | $0.6 \times 10^{-2}$ |
| Heat exchange load, BTU/ton min. | 391 | 286 |
| Ideal C.O.P | 0.714 | 0.766 |

In a particular residential unit which has the foregoing heat storage capability and cooling capacity, the following are specifications for individual components. In operation, this system operates with a coefficient of performance which is generally as high as 90% of theoretical, and often in the range from about 90% to 95% of theoretical, irrespective of how the theoretical C.O.P. is to be calculated.

What is claimed is:

1. In an absorption-desorption process for providing refrigeration in a cooling mode, and optionally heat in a heating mode, wherein ammonia is alternatively absorbed and desorbed from an absorbent in an absorber and generator respectively, and liquid ammonia is expanded through an expansion valve into an evaporator, the improvement comprising, (a) absorbing said ammonia in a pumpable low ammoniate complex of ammonia and ammonium chloride in about equimolar amounts, (b) enriching said low ammoniate with ammonia until said low ammoniate is converted to a high ammoniate complex of ammonium chloride and ammonia in the molar ratio of about 3 $NH_3$:1 $NH_4Cl$, (c) desorbing said high ammoniate so as to evaporate about 2 moles of ammonia per mole of $NH_4Cl$, and, (d) returning low ammoniate to said absorber.

2. The process of claim 1 wherein desorbing said high ammoniate in said generator is effected by heat exchange with a heat source at a temperature in the range from 65° C. to below 100° C.

3. The process of claim 2 wherein said heat source is geothermal, waste or solar heat.

4. The process of claim 2 wherein absorbing said ammonia in said low ammoniate is effected prior to introducing said low ammoniate into said absorber.

5. The process of claim 2 in said cooling mode, comprising the additional step of heat exchanging high ammoniate from said absorber against low ammoniate from said generator.

6. The process of claim 2 in said heating mode, comprising the additional step of heat exchanging ammonia vapors from said evaporator against liquid ammonia prior to it being expanded in said expansion valve.

7. The process of claim 2 wherein the coefficient of performance is in the range from about 90% to about 95% of theoretical.

8. The process of claim 3 wherein said heat source is at a temperature in the range from 65° C. to below about 90° C.

9. A working liquid adapted for use in an absorption-desorption process providing refrigeration, and optionally heating, said working liquid consisting essentially of a pumpable liquid ammoniate complex of ammonia chemically combined with ammonium chloride to form ammoniated ammonium chloride in continuously varying ratios in the range from about equimolar amounts, to about 3 moles of ammonia per mole of ammonium chloride.

* * * * *